(12) United States Patent
Kawamura

(10) Patent No.: US 10,076,859 B2
(45) Date of Patent: *Sep. 18, 2018

(54) TRANSFER MOLDING METHOD, TRANSFER MOLDING DEVICE, AND MOLDED ARTICLE

(71) Applicant: CANON KABUSHIKI KAISHA, Tokyo (JP)

(72) Inventor: Shogo Kawamura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 452 days.

This patent is subject to a terminal disclaimer.

(21) Appl. No.: 14/700,352

(22) Filed: Apr. 30, 2015

(65) Prior Publication Data

US 2015/0328810 A1 Nov. 19, 2015

(30) Foreign Application Priority Data

May 13, 2014 (JP) ................. 2014-099611

(51) Int. Cl.
| | |
|---|---|
| *B29C 45/00* | (2006.01) |
| *B29C 45/02* | (2006.01) |
| *B29C 45/16* | (2006.01) |
| *B29C 45/26* | (2006.01) |
| *B32B 3/26* | (2006.01) |
| *B32B 3/30* | (2006.01) |
| *B32B 27/08* | (2006.01) |
| *B32B 27/38* | (2006.01) |

(Continued)

(52) U.S. Cl.
CPC .............. *B29C 45/02* (2013.01); *B29C 45/16* (2013.01); *B29C 45/2602* (2013.01); *B29C 45/2624* (2013.01); *B32B 3/266* (2013.01); *B32B 3/30* (2013.01); *B32B 27/08* (2013.01); *B32B 27/38* (2013.01); *B29C 33/0088* (2013.01); *B29C 45/14467* (2013.01); *B29K 2063/00* (2013.01); *B29K 2105/16* (2013.01); *Y10T 428/1352* (2015.01)

(58) Field of Classification Search
None
See application file for complete search history.

(56) References Cited

U.S. PATENT DOCUMENTS 3,900,640 A * 8/1975 Vecchiotti ............... B29C 41/22
138/137
4,358,552 A * 11/1982 Shinohara ................ C08K 3/34
257/E23.121

(Continued)

FOREIGN PATENT DOCUMENTS

| JP | 58-225642 A | 12/1983 |
|---|---|---|
| JP | 11-042670 A | 2/1999 |

OTHER PUBLICATIONS

Kawamura, U.S. Appl. No. 14/561,643, filed Dec. 5, 2014.

*Primary Examiner* — Francisco W Tschen
(74) *Attorney, Agent, or Firm* — Fitzpatrick, Cella, Harper & Scinto

(57) ABSTRACT

Provided are a molding method for efficiently and accurately performing molding of a layered component made of a thermosetting resin by a simple mechanism, and molded articles. For this purpose, primary molding for molding a plurality of divided bodies and secondary molding for joining the plurality of divided bodies with one another are performed sequentially.

11 Claims, 24 Drawing Sheets

(51) Int. Cl.
*B29K 63/00* (2006.01)
*B29C 45/14* (2006.01)
*B29C 33/00* (2006.01)
*B29K 105/16* (2006.01)

(56) References Cited

U.S. PATENT DOCUMENTS

2005/0012243 A1* 1/2005 Saeki ................... B29C 45/0025
  264/328.8
2006/0003048 A1* 1/2006 Jaroschek ............... B29C 45/12
  425/572
2012/0049408 A1* 3/2012 Okamoto .............. B29C 45/045
  264/255

* cited by examiner

TRANSFER MOLDING METHOD, TRANSFER MOLDING DEVICE, AND MOLDED ARTICLE

BACKGROUND OF THE INVENTION

Field of the Invention

The present invention relates to a transfer molding method and a transfer molding device that mold a hollow molded article with a thermosetting resin, and to a molded article.

Description of the Related Art

Heretofore, as a method for molding a hollow component by an injection molding method, a method is known which molds a divided body by primary molding, and makes a plurality of divided bodies abut on and join with one another by secondary molding. For a molding device, a die sliding system is known for sliding a die between the primary molding and the secondary molding. Further, a system (Japanese Patent Laid-Open No. H11-042670 (1999)) is known in which a divided body is molded with an intermediate die sandwiched between a lower die and an upper die (primary molding) and, subsequently, the intermediate die is released to make the lower die and the upper die abut on each other so as to perform molding (secondary molding), and then the divided bodies on which the primary molding has been performed using the both dies are joined with each other.

Further, as for a molded article requiring high dimensional accuracy, since a large amount of filler having a small line expansion rate such as silica is included in a resin, flowability of the resin is deteriorated when it is injected. Therefore, when material including a large amount of filler is molded, a transfer molding method that can easily deal with the material having a low flowability is used.

Of the transfer molding method, as a method for obtaining multiple pieces of molded articles, a method (Japanese Patent Laid-Open No. S58-225642(1983)) is known in which a plurality of thin dies is layered, and molding is performed over a plurality of stages at a time using a multiple-stage passing-through chamber.

As described in Japanese Patent Laid-Open No. H11-042670(1999), in an injection molding method for injecting from a side face of the intermediate die into the upper die and the lower die, a T-shaped runner, for example, is formed inside the die. When the molding is performed using the thermosetting resin, since the resin left in the runner inside the intermediate die becomes hard along with the molding (hardening) of the divided body, post handling including breakdown cleaning may be necessary. Particularly, it is remarkable for the resin having quick hardening reaction. Further, even though the runner for the primary molding is disposed on an abutment face of each die to avoid the breakdown cleaning of the die, since the different runners between the primary molding and the secondary molding are used, the resin needs to be injected from a plurality of points, thereby making the device complicated. There is a problem in which the device becomes further complicated to mold a layered component of the divided bodies including three stages or four stages.

The transfer molding method according to Japanese Patent Laid-Open No. S58-225642(1983), the plurality of the divided bodies can be molded at a time using the die including a plurality of stages. As the method for joining the divided bodies with one another, a method is known for inserting the divided bodies into another device to perform the molding. However, with this method, there is a problem in which, since the divided bodies are released from the die once, positioning of the divided bodies to be joined with one another is difficult and, in addition, a dimensional accuracy is hard to be realized due to warpage of the divided bodies.

SUMMARY OF THE INVENTION

Therefore, the present invention provides a transfer molding method and a transfer molding device for efficiently and accurately performing molding of a layered component made of a thermosetting resin by a simple mechanism, and molded articles.

Therefore, a transfer molding method for molding thermosetting resin includes: a mold clamping step of clamping a first die in which a first divided body of a molded article is molded, a third die in which a third divided body of the molded article is molded, and at least one second die which is sandwiched between the first die and the third die and in which a second divided body of the molded article is molded, so as to form; a chamber; a first cavity surrounded by a part of the first divided body and a part of the second divided body; a second cavity surrounded by a part of the second divided body and a part of the third divided body; and an injection path communicating the chamber, the first cavity, and the second cavity with one another; and a molding step of injecting a thermosetting resin into the first cavity and the second cavity from the chamber via the injection path to join the first divided body with the second divided body and join the second divided body with the third divided body.

According to the present invention, the transfer molding method sequentially performs primary molding for molding a plurality of divided bodies, and secondary molding for joining the plurality of divided bodies with one another. With the method described above, it is possible to realize the transfer molding method and the transfer molding device that efficiently and accurately perform molding of a layered component made of a thermosetting resin by a simple mechanism, and the molded articles.

Further features of the present invention will become apparent from the following description of exemplary embodiments (with reference to the attached drawings).

DESCRIPTION OF THE EMBODIMENTS (First Embodiment)

With reference to drawings, a transfer molding method, dies, and a molded article according to a first embodiment of the present invention will be described below.

Figure 1A:
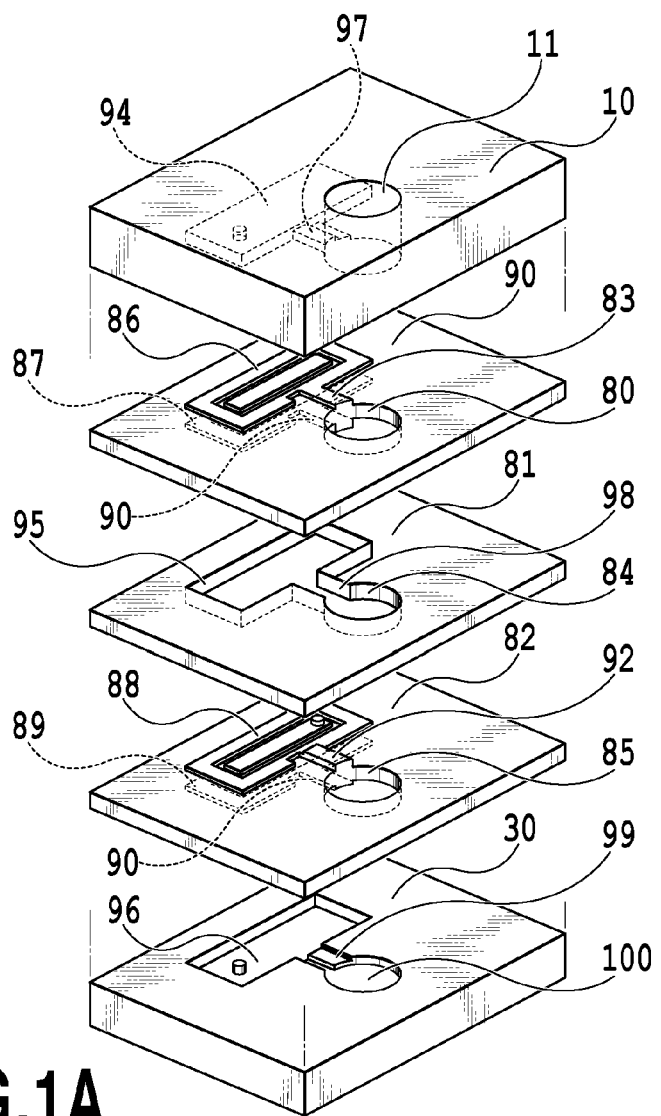
FIG. 1A is an exploded perspective view of dies.
Figure 1B:
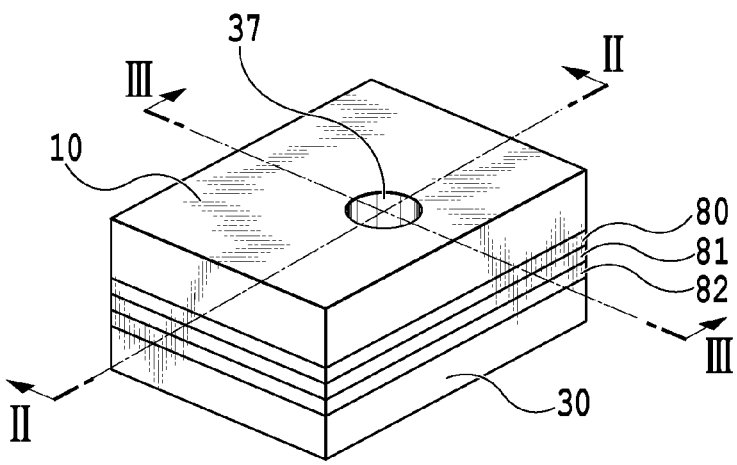
FIG. 1B is a perspective view of the clamped dies.

FIGS. 1A, 1B illustrate the dies to which the first embodiment can be applied. FIG. 1A is an exploded perspective view of the dies, and FIG. 1B is a perspective view of the clamped dies. A transfer molding die includes an upper die 10, a first intermediate die 80, a second intermediate die 81, a third intermediate die 82, and a lower die 30 which can be each layered as illustrated in FIG. 1A. The upper die 10 includes a first chamber 11 via which a thermosetting resin (molding material) is poured, a first groove 97, a first cavity 94 that is a portion to be one layer of a layered component. The first intermediate die 80 includes a second chamber 83 formed sequentially from the first chamber 11 of the upper die 10, and further includes a first core 86 and a first fitting portion 90 at an upper die side, and a second core 87 and a second fitting portion 91 at a second intermediate die side.

The second intermediate die 81 includes a third chamber 84 formed sequentially from the second chamber 83 of the first intermediate die 80, a second groove 98, and a second cavity 95 that is to be one layer of the layered component. The third intermediate die 82 includes a fourth chamber 85 formed sequentially from the third chamber 84 of the second intermediate die 81, and further includes a third core 88 and a third fitting portion 92 at the second intermediate die side, and a fourth core 89 and a fourth fitting portion 93 at a lower die side. The lower die 30 includes a fifth chamber 100 formed sequentially from the fourth chamber 85 of the third intermediate die 82, a third groove 99, and a third cavity 96 that is to be one layer of the layered component.

The upper die 10, the first intermediate die 80, the second intermediate die 81, the third intermediate die 82, and the lower die 30 are clamped, so that the first chamber 11, the second chamber 83, the third chamber 84, the fourth chamber 85, and the fifth chamber 100 are combined with one another. With this processing, a chamber 37 is formed by the primary molding.

Figure 2:
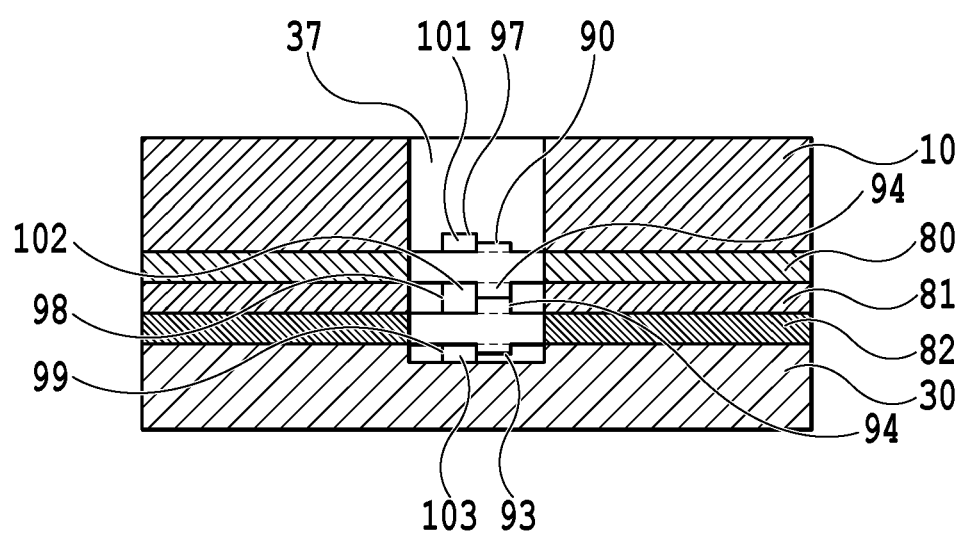
FIG. 2 is a cross-sectional view taken along the line II-II illustrated in FIG. 1B.
Figure 3A:
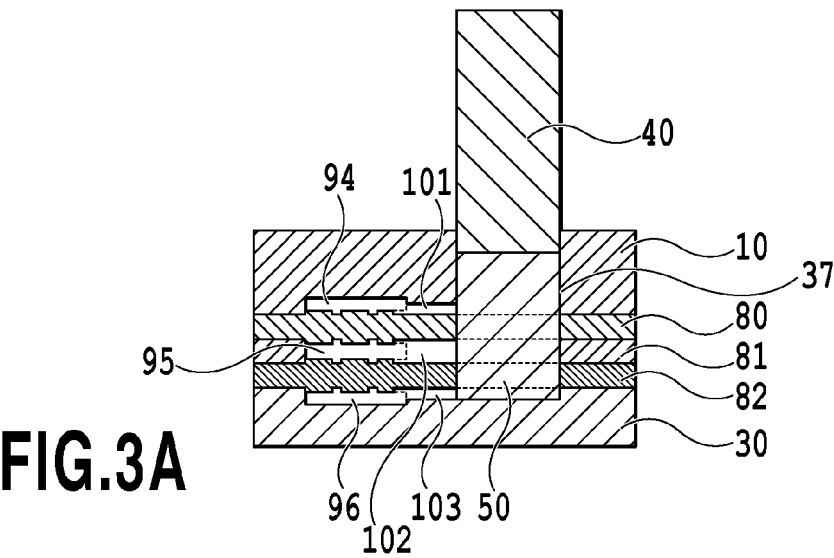
FIG. 3A is a cross-sectional view taken along the line III-III illustrated in FIG. 1B.
Figure 3B:
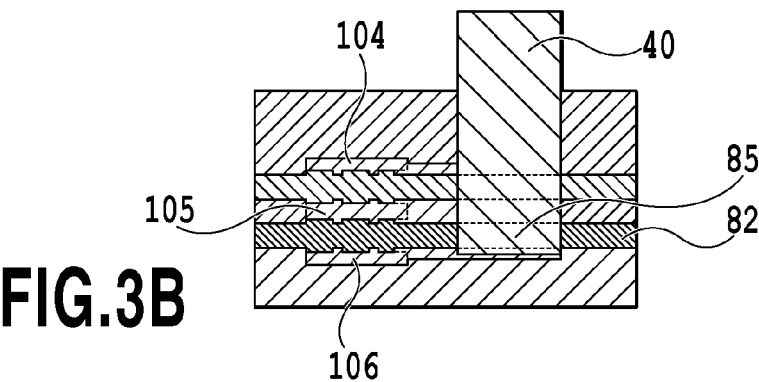
FIG. 3B is a cross-sectional view taken along the line III-III illustrated in FIG. 1B.
Figure 3C:
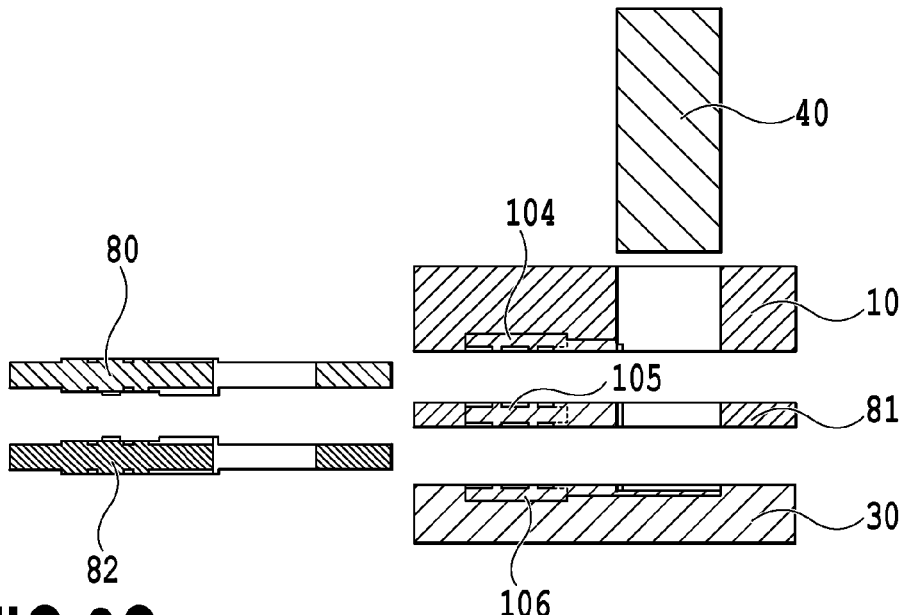
FIG. 3C is a cross-sectional view taken along the line III-III illustrated in FIG. 1B.

FIG. 2 is a cross-sectional view taken along the line II-II illustrated in FIG. 1B, and illustrates a combination state of the dies when the primary molding is performed. Further, FIGS. 3A to 3C are cross-sectional views taken along the line III-III illustrated in FIG. 1B, and illustrate a state of each process when the first molding is performed. As illustrated in FIG. 2, the first fitting portion 90 of the first intermediate die 80 is fitted into the first groove 97 of the upper die 10 to close a part of the first groove 97. A space of the first groove 97 which is not closed becomes a first primary-molding injection path 101.

The second fitting portion 91 of the first intermediate die 80 and the third fitting portion 92 of the third intermediate die 82 are fitted into the second groove 98 of the second intermediate die 81 to close a part of the second groove 98. A space of the second groove 98 that is not closed becomes a second primary-molding injection path 102. The fourth fitting portion 93 of the third intermediate die 82 is fitted into the third groove 99 of the lower die 30 to close a part of the third groove 99. A space of the third groove 99 that is not closed becomes a third primary-molding injection path 103.

As illustrated in FIG. 3A, the upper die 10 and the first intermediate die 80 are combined with each other so that the first core 86 of the first intermediate die 80 is fitted into the first cavity 94 of the upper die 10 to form a cavity forming one layer of the layered component. Further, the first intermediate die 80, the second intermediate die 81, and the third intermediate die 82 are combined with one another so that the second core 87 of the first intermediate die 80 and the third core 88 of the third intermediate die 82 are fitted into the second cavity 95 to form a cavity forming one layer of the layered component. Furthermore, the third intermediate die 82 and the lower die 30 are combined with each other so that the fourth core 89 of the third intermediate die 82 is fitted into the third cavity 96 of the lower die 30 to form a cavity forming one layer of the layered component.

The chamber 37 of the die is formed, the die being formed by clamping (adjusting) the upper die 10, the first intermediate die 80, the second intermediate die 81, the third intermediate die 82, and the lower die 30 with one another. A thermosetting resin 50 in an amount of a load of molding is poured into the chamber 37 (formed of the first chamber 11, the second chamber 83, the third chamber 84, the fourth chamber 85, and the fifth chamber 100). Subsequently, the thermosetting resin 50 is pressured by a plunger 40, and then injected into the first cavity 94, the second cavity 95, and the third cavity 96 via a first primary-molding injection path 101, a second primary-molding injection path 102, and a third primary-molding injection path 103.

The thermosetting resin 50 used in the present embodiment is an epoxy resin composition that does not include internal mold release agent such as wax. Mold release agent is desirably applied to the die before the molding. As the mold release agent, fluorine based mold release agent is preferable due to less transfer to a molded article. Further, the thermosetting resin according to the present embodiment includes the filler of silica in 60% or more capacity ratio. Since silica is filled minutely, the molding can be performed with high dimensional accuracy. In addition to silica, the filler such as mica and alumina may be included, which allows the molding with high dimensional accuracy. Furthermore, a temperature of the die is set to be at approximately 130 to 200° C. After the thermosetting resin 50 is poured into the chamber 37, wait 5 to 10 seconds to melt material, and then pressure the thermosetting resin 50 by the plunger 40.

FIG. 3B is a cross-sectional view illustrating a state after the resin is injected in the primary molding. As illustrated in FIGS. 3A, 3B, the melted thermosetting resin 50 is pressured by the plunger 40 to be injected into the first cavity 94 via the first primary-molding injection path 101 formed in the upper die 10. Similarly, the thermosetting resin is injected into the second cavity 95 via the second primary-molding injection path 102 formed in the second intermediate die 81. Similarly, the thermoset resin 50 is injected into the third cavity 96 via the third primary-molding injection path 103 formed in the lower die 30.

At this point, the air in each cavity is discharged via spaces on an abutment face of each die. The thermosetting resin 50 is hardened inside the heated die in approximately 50 to 300 seconds. A first divided body 104 is molded in the first cavity 94 of the upper die 10. A second divided body 105 is molded in the second cavity 95 of the second intermediate die 81. A third divided body 106 is molded in the third cavity 96 of the lower die 30. If an amount of the thermosetting resin 50 to be poured in the primary molding is set to be an amount such that, when all material is injected, the plunger 40 passes through the fourth chamber 85 of the third intermediate die 82, cull is not left in the intermediate dies when the die is opened, thereby making maintenance easier.

FIG. 3C is a cross-sectional view illustrating a state where the primary molding is finished and the first intermediate die 80 and the third intermediate die 82 are retreated. After the primary molding is finished, the plunger 40, the upper die 10, the first intermediate die 80, the second intermediate die 81, and the third intermediate die 82 are moved upward to open the dies. At this point, the first divided body 104 is left in the upper die 10, the second divided body 105 is left in the second intermediate die 81, and the third divided body 106 is left in the lower die 30. This state can be realized by differentiating release slopes of the dies and setting push-up pins. After the dies are opened, the first intermediate die 80 and the third intermediate die 82 are retreated in a lateral direction. According to the present embodiment, the lower die 30 is defined as a fixed die, the upper die 10, the first intermediate die 80, the second intermediate die 81, and the third intermediate die 82 are each defined as a mobile die that move. However, the upper die 10 may be the fixed die, and other dies may be the mobile dies.

Figure 4A:
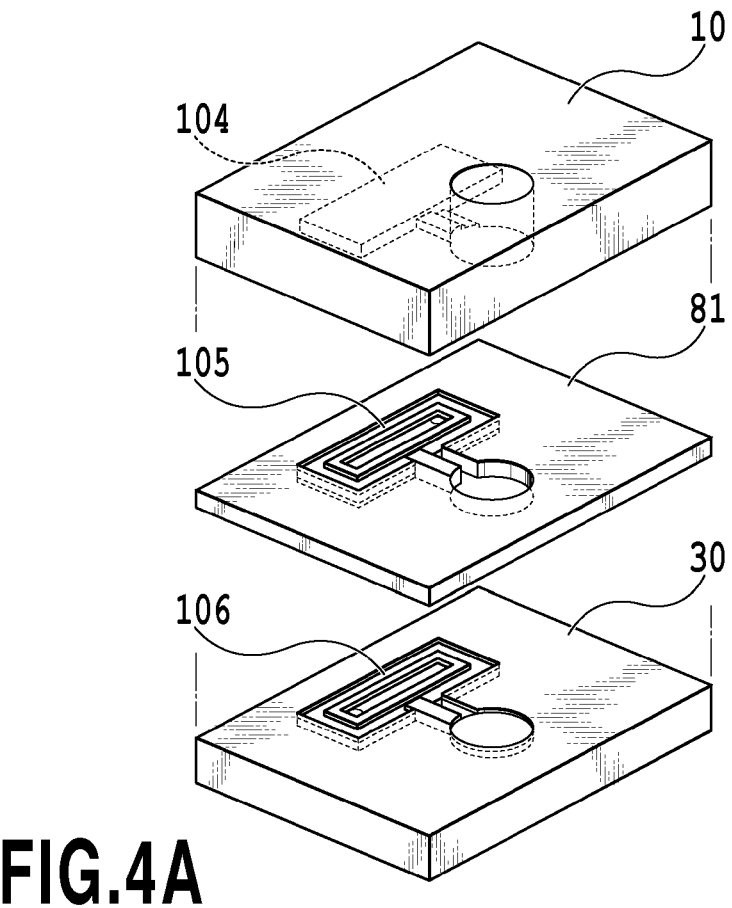
FIG. 4A is an exploded perspective view of the dies before secondary molding.
Figure 4B:
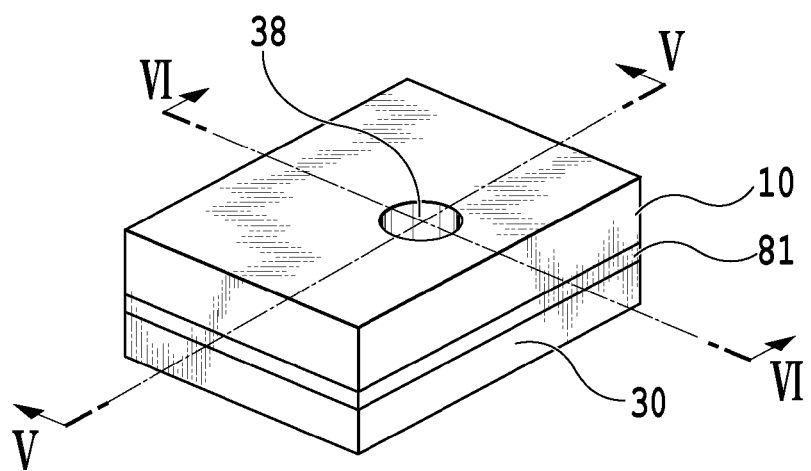
FIG. 4B is a perspective view of the clamped dies.

FIG. 4A is an exploded perspective view of the die before the secondary molding. FIG. 4B is a perspective view after the dies are clamped in the secondary molding. As illustrated in FIG. 4A, in the secondary molding, the upper die 10, the second intermediate die 81, and the lower die 30 that hold the divided body molded by the primary molding are precisely adjusted to be clamped. By clamping them, a part of the first divided body 104 and a part of the second divided body 105 abut on each other to form a cavity to be molded by the secondary molding among the both divided bodies, the upper die 10, and the second intermediate die 81. Further, a part of the second divided body 105 and a part of the third divided body 106 abut on each other to form a cavity also among the both divided bodies, the second intermediate die 81, and the lower die 30.

Furthermore, as illustrated in FIG. 4B, by closing the upper die 10, the second intermediate die 81, and the lower die 30, a chamber 38 for the secondary molding that has formed a part of the chamber 37 for the primary molding (first chamber 11, third chamber 84, and fifth chamber 100) is formed. Since each divided body is kept fixed to each of the upper die 10, the second intermediate die 81, and the lower die 30, and an axis of the upper die 10 and the second intermediate die 81 when moving is the same as when the primary molding is performed, they abut on each other with high positional accuracy, and the cavities are formed annularly around the abutment portions 53 of the divided bodies.

Figure 5:
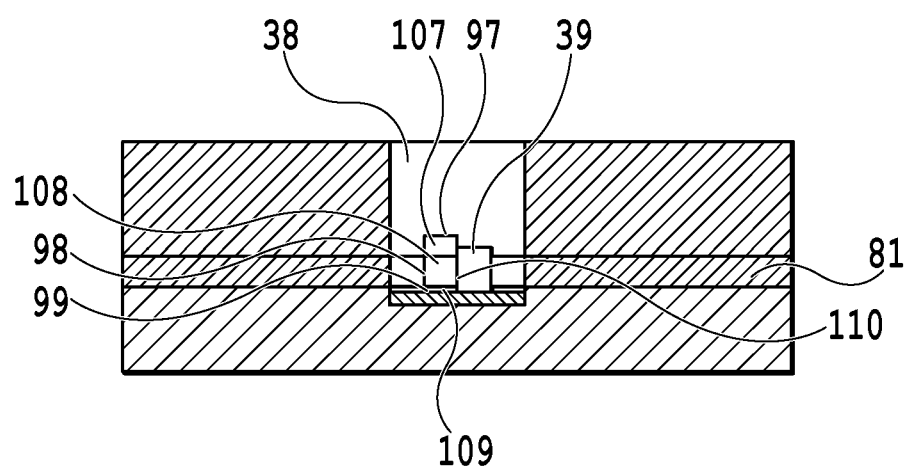
FIG. 5 is a cross-sectional view taken along the line V-V illustrated in FIG. 4B.

FIG. 5 is a cross-sectional view taken along the line V-V illustrated in FIG. 4B. By opening the dies, the first fitting portion 90 of the first intermediate die fitted into the first groove 97 of the upper die 10 is released. Similarly, the second fitting portion 91 of the first intermediate die 80 fitted into the second groove 98 of the second intermediate die and the third fitting portion 92 of the third intermediate die 82 are released. Further, the fourth fitting portion 93 of the third intermediate die fitted into the third groove 99 of the lower die is released. When the first intermediate die and the third intermediate die are retreated, and the upper die 10, second intermediate die 81, and the lower die 30 are closed, the first groove 97, the second groove 98, and the third groove 99 are combined with one another to form a secondary-molding injection path 39 making the chamber 38 to communicate with a new cavity.

In the first groove 97, the second groove 98, and the third groove 99, resin used in the primary molding is left at a portion that has been used as an injection path in the primary molding. A first runner resin 107 connecting with the first divided body 104 is left in the first groove 97, a second runner resin 108 connecting with the second divided body 105 is left in the second groove 98, and a third runner resin 109 connecting with the third divided body 106 is left in the third groove 99. The second groove 98 of the second intermediate die 81 has a shape of passing through in a thickness direction thereof, and forms a part of the secondary-molding injection path 39 at a side face 110 of the second runner resin 108. The secondary-molding injection path 39 is a common injection path communicating with both a forth cavity 112 and a fifth cavity 113.

Figure 6A:
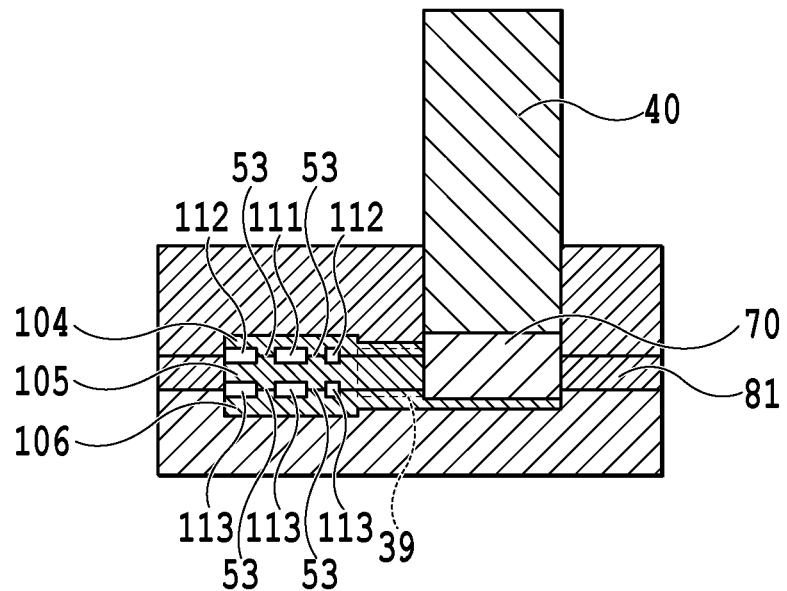
FIG. 6A is a cross-sectional view taken along the line VI-VI illustrated in FIG. 4B.
Figure 6B:
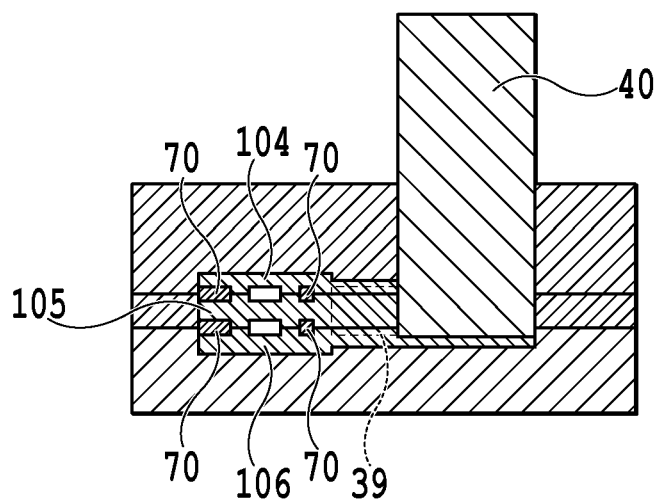
FIG. 6B is a cross-sectional view taken along the line VI-VI illustrated in FIG. 4B.

FIGS. 6A, 6B are cross-sectional views taken along the line XI-XI illustrated in FIG. 4B. FIGS. 6A, 6B each illustrate a state for each process of the secondary molding. As illustrated in FIG. 6A, by clamping the dies, the divided bodies abut on each other to form a space 111 at an inside surrounded by the abutment portions 53 and a cavity for the secondary molding outside the abutment portions 53. Between the first divided body 104 and the second divided body 105, the space 111 and the fourth cavity 112 are formed. Between the second divided body 105 and the third divided body 106, the space 111 and the fifth cavity 113 are formed. Each of the cavities 112, 113 is communicated with the chamber 38 via the secondary-molding injection path 39. Further, the fourth cavity 112 and the fifth cavity 113 are communicated with each other via the secondary-molding injection path 39 (broken line).

After the thermosetting resin 70 in an amount of a load of molding is poured into the chamber 38, as illustrated in FIG. 6B, the melted thermosetting resin 70 is pressured by the plunger 40, and the thermosetting resin 70 is injected into the fourth cavity 112 and the fifth cavity 113 via the secondary-molding injection path 39. The thermosetting resin 70 is hardened in approximately 50 to 300 seconds in the heated die similarly to the resin in the primary molding, and joins the first divided body 104, the second divided body 105, and the third divided body 106 with one another. The thermosetting resin 70 for the secondary molding can acquire good joining property if the same material as the thermosetting resin 50 for the primary molding is used. According to the present embodiment, the epoxy resin composition that does not include the internal mold release agent such as the wax including the same material as the thermosetting resin for the primary molding is used.

Figure 7A:
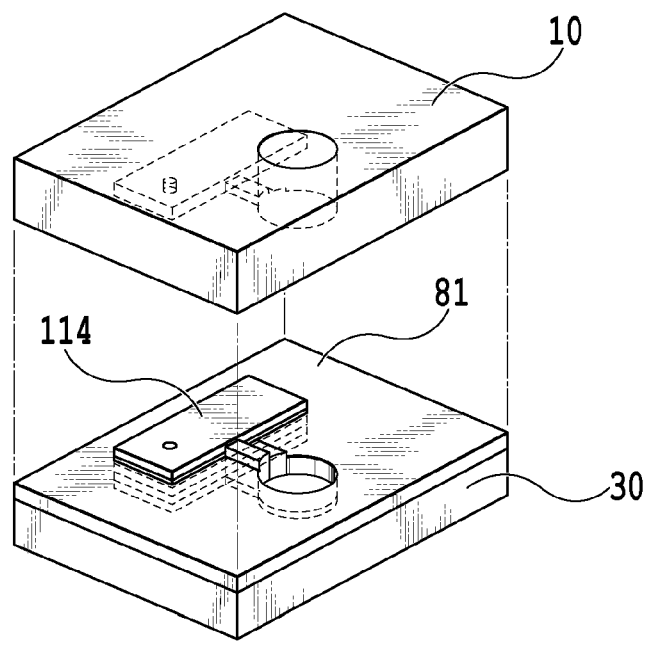
FIG. 7A is a perspective view illustrating a demolding process after the secondary molding.
Figure 7B:
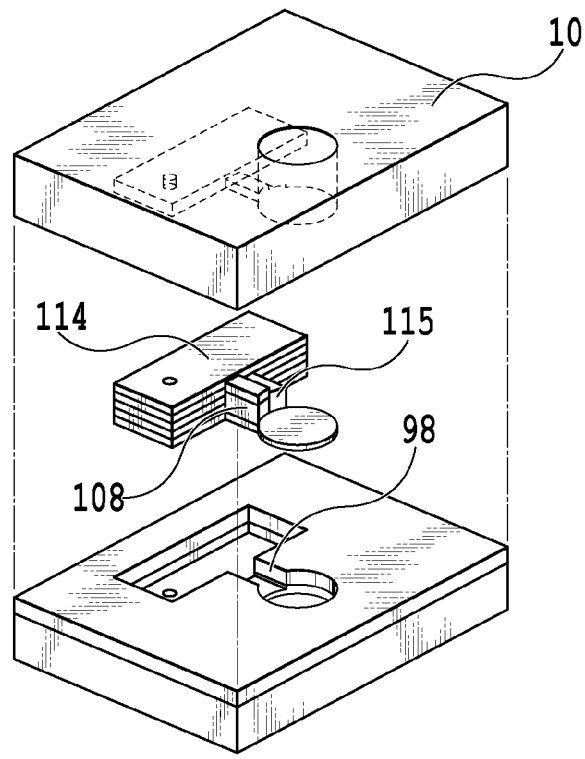
FIG. 7B is a perspective view illustrating the demolding process after the secondary molding.

FIGS. 7A, 7B are perspective views illustrating a demolding process after the secondary molding. FIGS. 7A, 7B each illustrate a state of each process of the demolding process. As illustrated in FIG. 7A, first, either die of the upper die 10 and the lower die 30 is opened. According to the present embodiment, the upper die 10 is opened, and the second intermediate die 81 is fixed to the lower die 30. A layered component 114 illustrated in FIG. 7A is left at the lower die side. As illustrated in FIG. 7B, the layered component 114 is pushed up to be released from the lower die side by a push-up mechanism (not illustrated). Since the second intermediate die 81 is acquired by simply letting go through an outer shape of the molded article, the second groove 98, and the chamber that are combined with one another, and hollowing out in the outer shape thereof, the second intermediate die 81 can be easily released by pushing up the layered component 114.

Figure 8:
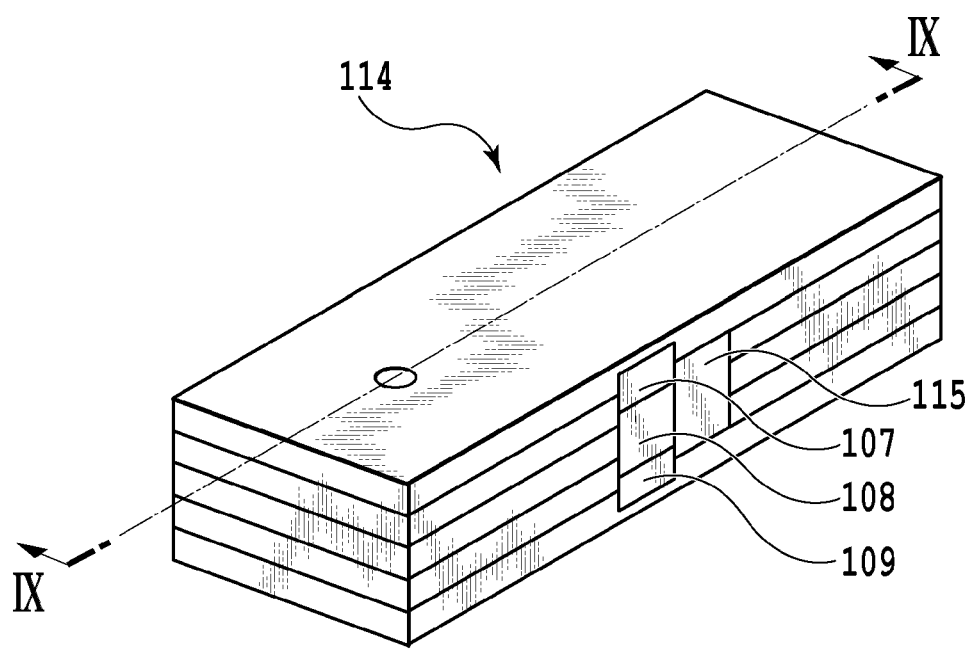
FIG. 8 is a perspective view of a layered component completed according to a first embodiment.

FIG. 8 is a perspective view of the layered component 114 completed according to the first embodiment. The first runner resin 107, the second runner resin 108, the third runner resin 109, and the fourth runner resin 115 which are not needed any more are cut off, so as to make layered component 114 into a completed body.

Figure 9:
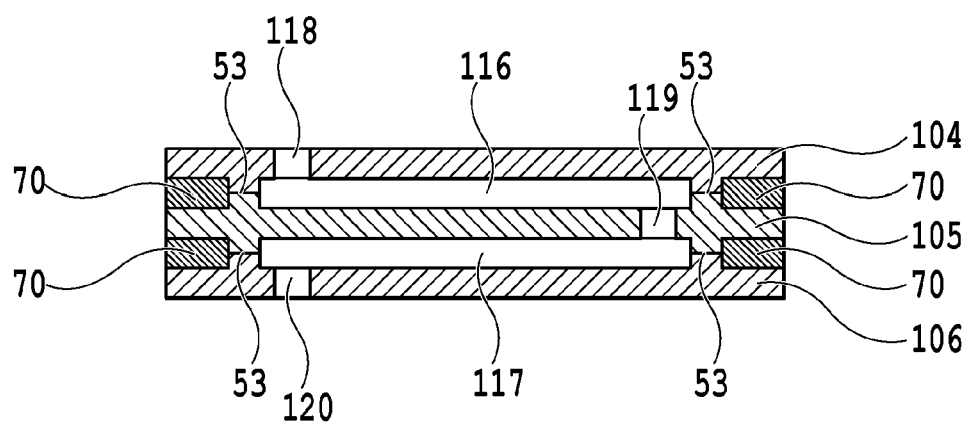
FIG. 9 is a cross-sectional view taken along the line IX-IX illustrated in FIG. 8.

FIG. 9 is a cross-sectional view taken along the line IX-IX illustrated in FIG. 8. The layered component 114 is formed by layering the first divided body 104, the second divided body 105, and the third divided body 106, which are joined with one another with the thermoset resin 70 for the secondary molding that has been injected into an outer circumference of the abutment portions 53 and hardened. Since the thermosetting resin used in the present embodiment is the material that does not include the internal mold release agent such as the wax, the divided body hardened in the primary molding and the thermosetting resin in the secondary molding are firmly joined with each other.

Inside the abutment portions 53, a first space 116 and a second space 117 communicated with each other via a communication opening 119 are formed. Further, the first space 116 is communicated with an outside via an inlet 118 formed in the first divided body 104. The second space 117 is communicated with the outside via an outlet 120 formed in the third divided body 106. A layered hollow component formed as described above can be used as a liquid supply component.

As a usage, for example, the layered hollow component can be used as an ink supply member to be used inside an ink-jet printer and a head that ejects ink. As other usages, they can be preferably used as components of water purification related articles including a water purification device, food and drink manufacturing apparatuses, and medical related articles. If joining strength is not required for the usage, the thermosetting resin including the mold release agent ingredient can be used.

A method for manufacturing a head of an ink-jet printer to which a molding method according to the present embodiment is adopted will be described below.

Figure 10A:
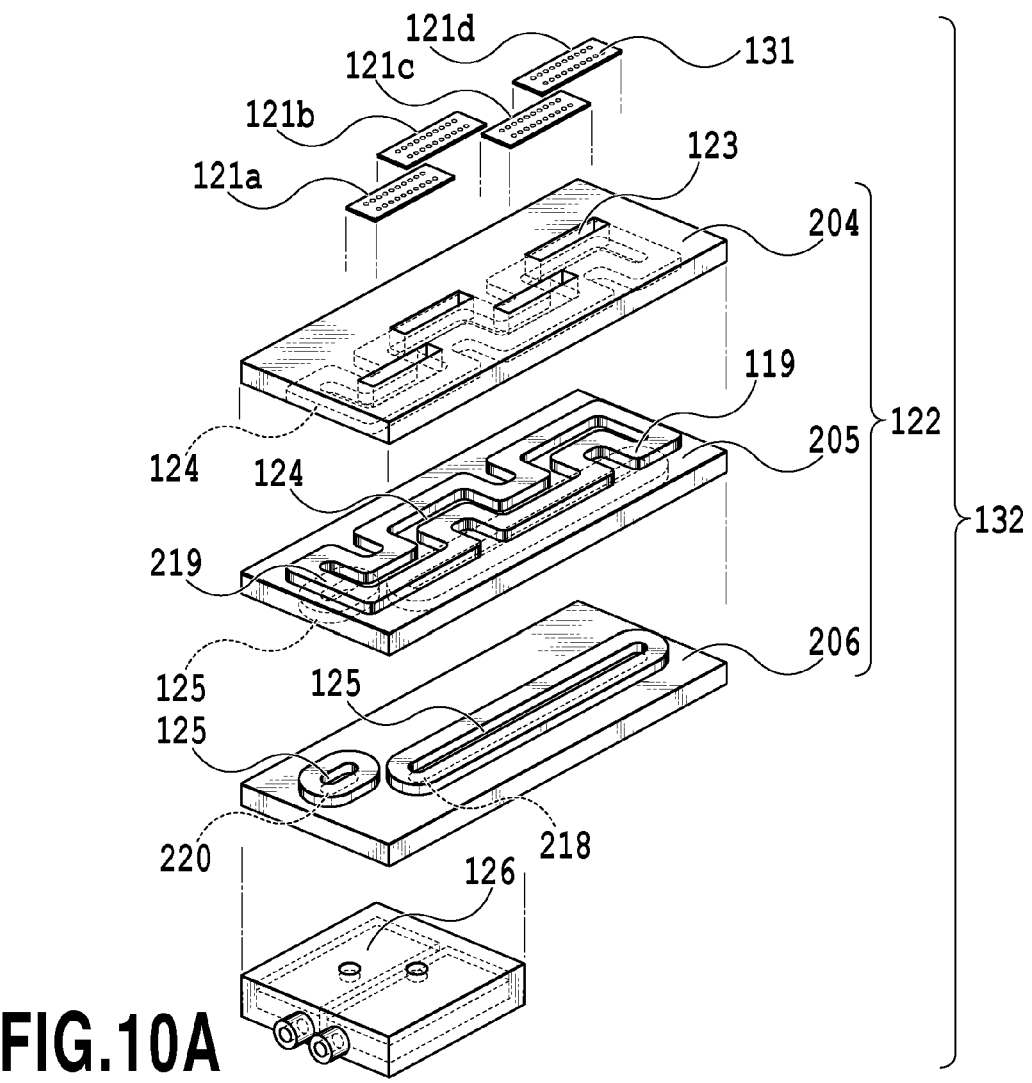
FIG. 10A is an exploded perspective view of a head.
Figure 10B:
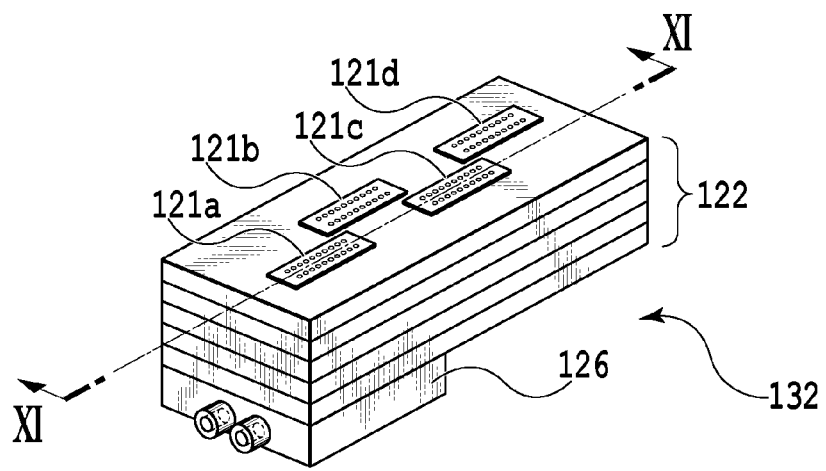
FIG. 10B is a perspective view after the head is completed.
Figure 11:
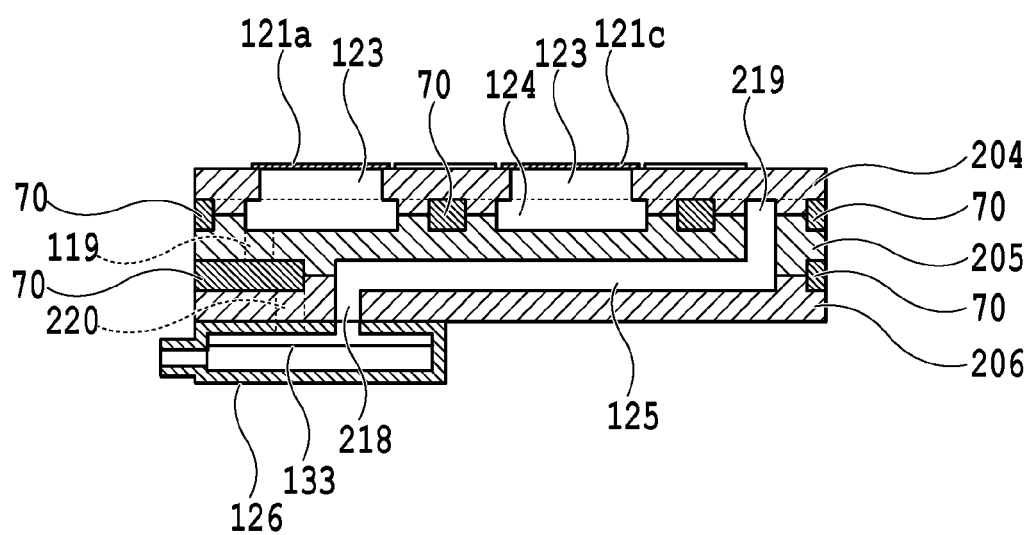
FIG. 11 is a cross-sectional view taken along the line XI-XI illustrated in FIG. 10B.

FIG. 10A is an exploded perspective view of the head of an ink-jet printer to which the first embodiment can be applied. FIG. 10B is a perspective view of the head that has been completely assembled. FIG. 11 is a cross-sectional view taken along the line XI-XI illustrated in FIG. 10B. In an ink-jet printer head 132, a plurality of recording element substrates 121a to 121d each including an ejecting opening 131 that ejects ink is joined and fixed to a support body including a flow passage referred to as a base plate 122 inside the support body, and the ink-jet printer head 132 includes a filter unit 126. The first divided body 204, the second divided body 205, and the third divided body 206 are joined with one another with the thermosetting resin 70 for the secondary molding to form the base plate 122.

A supply opening 123 for supplying recording liquid to each of the recording element substrates 121a to 121d is provided on a front face of the first divided body 204, and a part of a first flow passage 124 is formed on a back face thereof. A part of the first flow passage 124 is formed on a front face of the second divided body 205, and a part of a second flow passage 125 is formed on a back face thereof. The first flow passage 124 and the second flow passage 125 are communicated with each other via a communication opening 219. A part of the second flow passage 125 is formed on a front face of the third divided body 206, and an inlet 218 and an outlet 220 pass through to a back face thereof. Flow passages (first flow passage 124, second flow passage 125) of two layers are formed inside the base plate 122 as illustrated in FIG. 11, and the ink can circulate via the filter unit 126 including the filter 133 therein.

As described above, the transfer molding device including one resin injection mechanism (chamber and plunger) sequentially performs the primary molding for molding the plurality of divided bodies, and the secondary molding for joining the plurality of divided bodies with one another. With the device described above, the molding method for efficiently molding the layered component made of the thermosetting resin can be realized. Further, since the secondary molding can be performed without releasing the molded article from the die, the divided bodies can be joined with one another with high accuracy.

(Second Embodiment)

With reference to drawings, the second embodiment of the present invention will be described below. Since a basic configuration according to the present embodiment is similar to that of the first embodiment, only discriminative configurations will be described below.

Figure 12A:
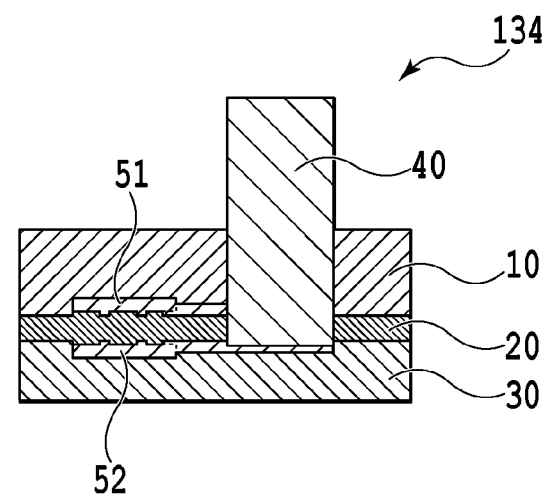
FIG. 12A is a cross-sectional view according to a second embodiment of the present invention.
Figure 12B:
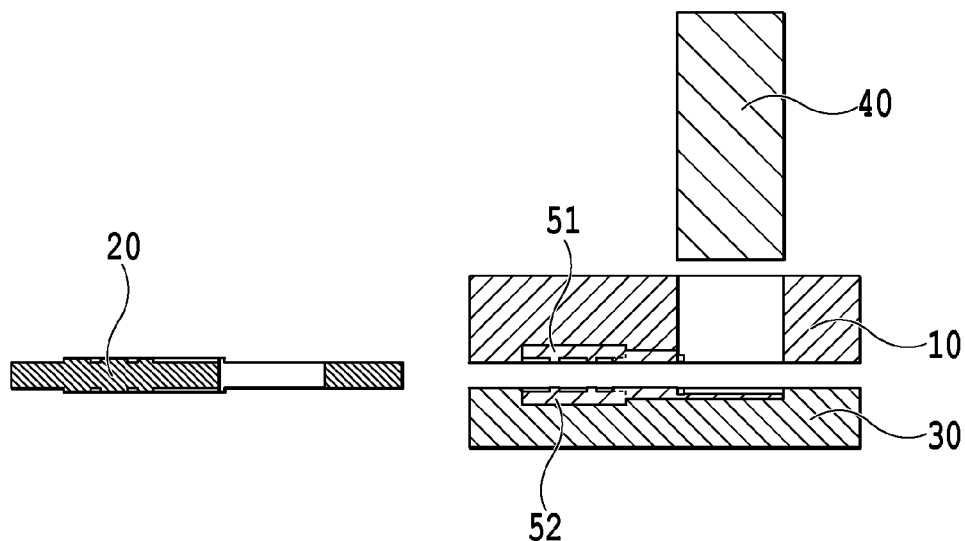
FIG. 12B is a cross-sectional view according to the second embodiment of the present invention.
Figure 13A:
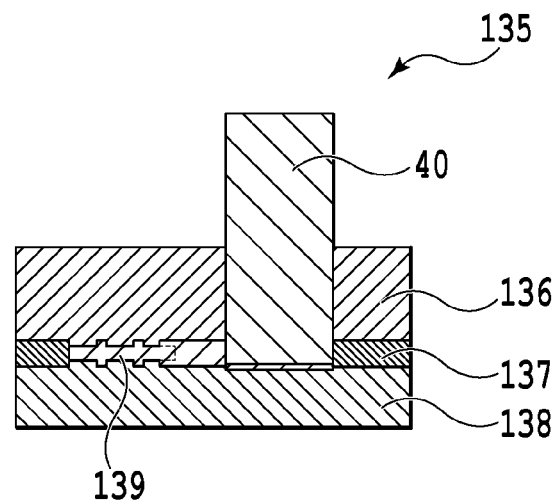
FIG. 13A is a cross-sectional view illustrating each process of second primary molding.
Figure 13B:
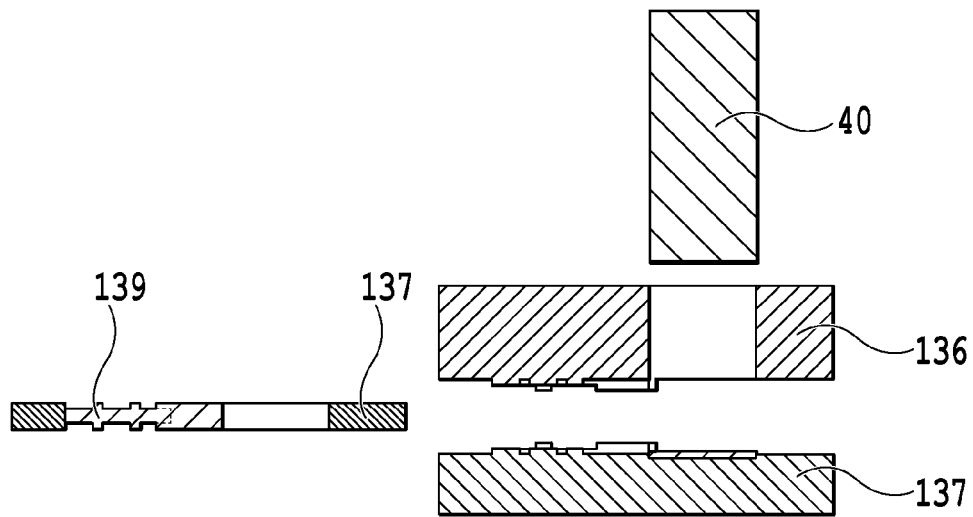
FIG. 13B is a cross-sectional view illustrating each process of second primary molding.
Figure 14A:
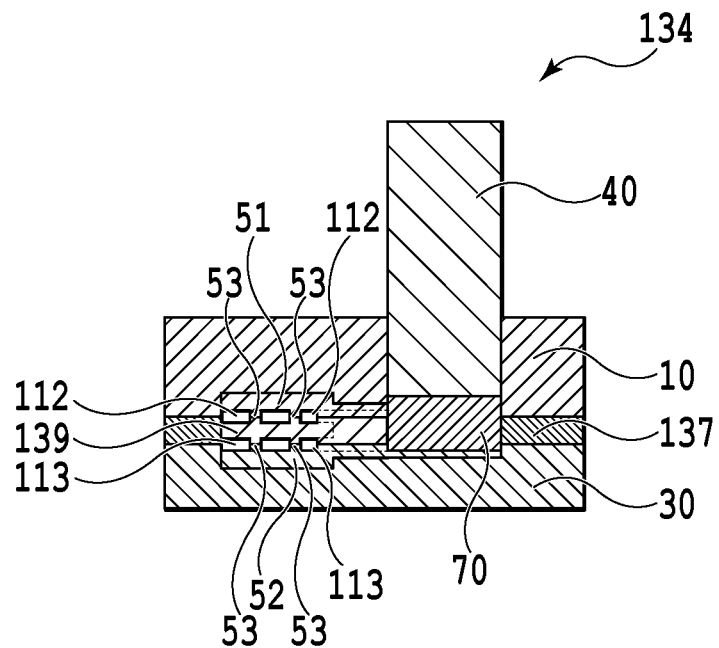
FIG. 14A is a cross-sectional view illustrating each process of secondary molding.
Figure 14B:
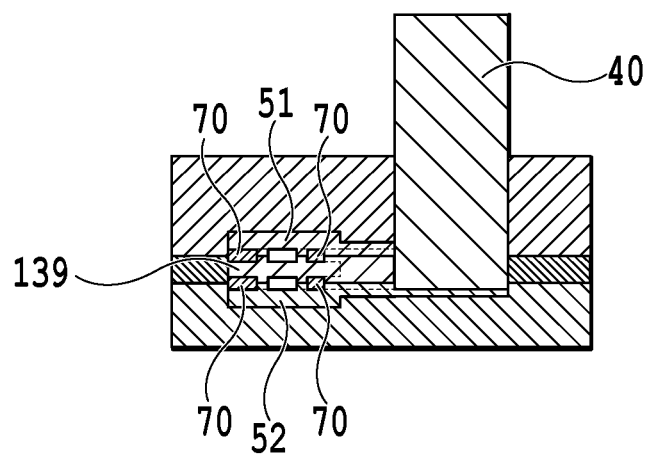
FIG. 14B is a cross-sectional view illustrating each process of the secondary molding.

FIGS. 12A, 12B are cross-sectional views of the second embodiment of the present invention. FIGS. 12A, 12B are cross-sectional views each illustrating a process of the first primary molding. FIGS. 13A, 13B are cross-sectional views each illustrating a process of the second primary molding. FIGS. 14A, 14B are cross-sectional views illustrating each process of the secondary molding. According to the present embodiment, the primary molding is performed using two transfer molding devices.

As illustrated in FIG. 12A, a first transfer molding device 134 performs the primary molding to mold a first divided body 51 and a second divided body 52 in two cavities partitioned by the intermediate die 20 using three dies of the upper die 10, the intermediate die 20, and the lower die 30. As illustrated in FIG. 12B, the dies are opened, and the intermediate die 20 is retreated in a state where the first divided body 51 is molded in the upper die 10 and the second divided body 52 is molded in the lower die 30.

On the other hand, as illustrated in FIG. 13A, a second transfer molding device 135 performs the primary molding to mold a third divided body 139 in the cavity provided in an intermediate die 137 using three dies of an upper die 136, an intermediate die 137, and a lower die 138. As illustrated in FIG. 13B, the dies are opened, and the intermediate die 137 is retreated in a state where the third divided body 139 is molded in the intermediate die 137.

As illustrated in FIG. 14A, the intermediate die 137 that is used to mold in a second transfer molding device 135 in the primary molding and retreated is incorporated into the first transfer molding device 134 in which the first divided body 51 and the second divided body 52 are molded and, then, clamped. At this point, the state illustrated in FIG. 14A becomes the same as that according to the first embodiment illustrated in FIG. 6A. The abutment portions 53 of the first divided body 51, the third divided body 139, and the second divided body 52 that are incorporated inside the first transfer molding device 134 are precisely adjusted to one another, and the cavities 112, 113 are formed at an outer circumference of the abutment portions 53. The thermosetting resin 70 for the second molding is poured into the chamber and, as illustrated in FIG. 14B, the thermosetting resin 70 is pressured by the plunger 40 to perform the secondary molding. Thus, similarly to the first embodiment, the adjacent divided bodies can be joined with each other with the thermosetting resin 70.

As described above, by sharing the primary molding between two molding devices, a molding efficiency can be improved. Further, unlike molding in which only the component to be molded is inserted, since the die including the component molded by the primary molding is also incorporated into another molding device, the divided bodies can be positioned according to dimensional accuracy of the dies. Therefore, the molding can be performed with the high accuracy similarly to the first embodiment. According to the present embodiment, the primary molding is performed using two transfer molding devices, but the present invention is not limited thereto. A plurality of, three for example, transfer molding devices may be used.

(Third Embodiment)

With reference to drawings, the third embodiment of the present invention will be described below. Since a basic configuration according to the present embodiment is the same as that of the first embodiment, only discriminative configurations will be described below.

Figure 15A:
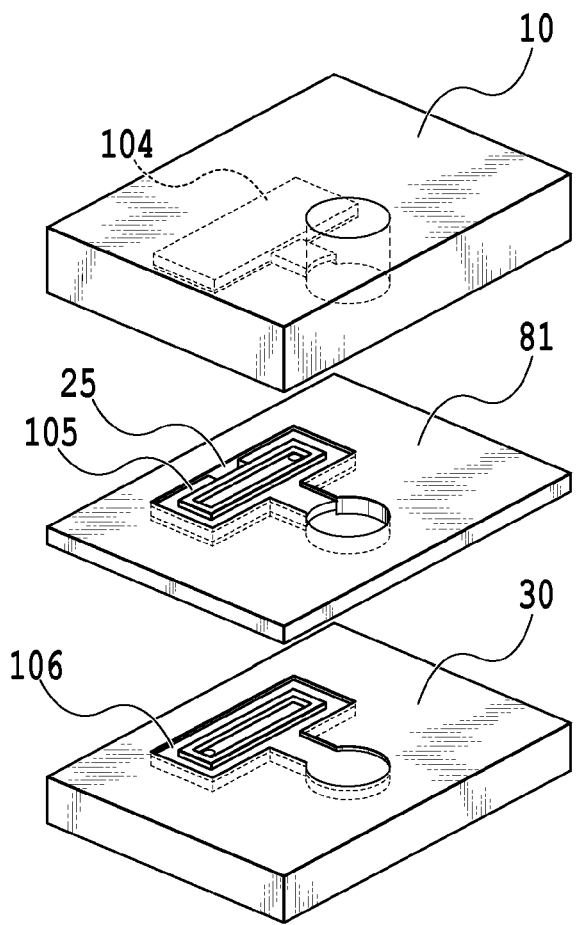
FIG. 15A illustrates dies to which a third embodiment can be applied.
Figure 15B:
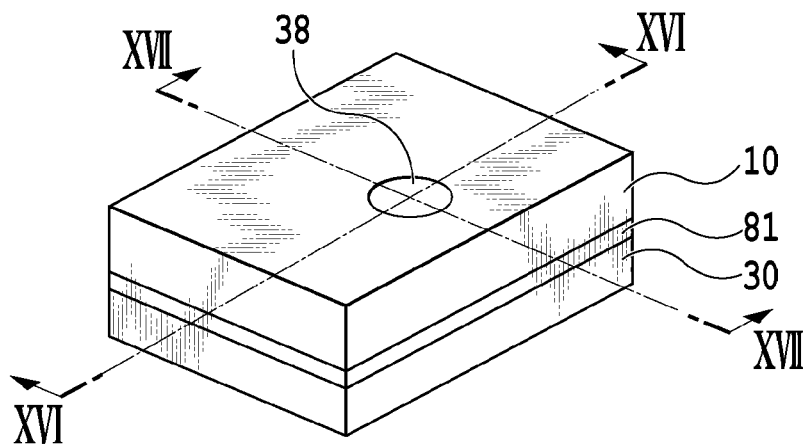
FIG. 15B illustrates the dies to which the third embodiment can be applied.
Figure 16:
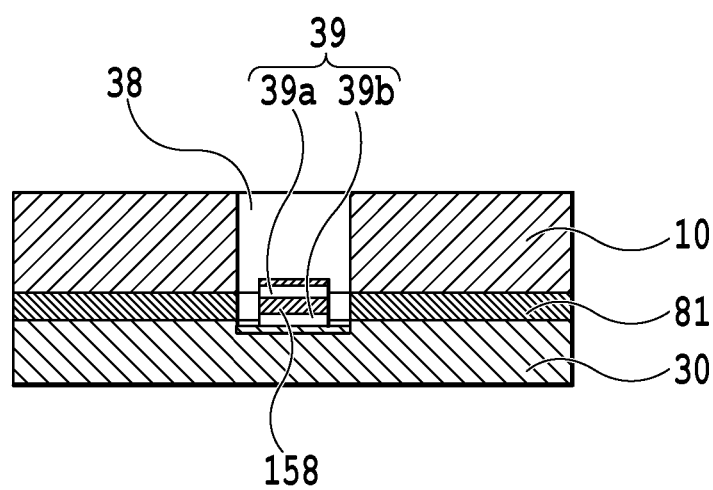
FIG. 16 is a cross-sectional view taken along the line XVI-XVI illustrated in FIG. 15B.
Figure 17:
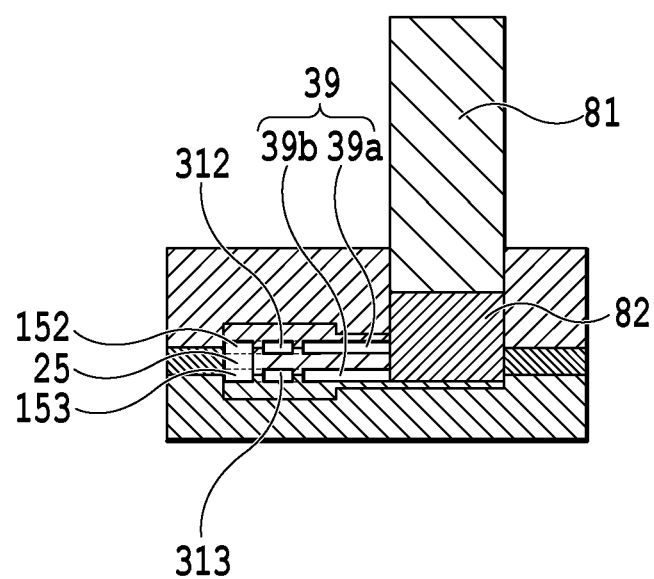
FIG. 17 is a cross-sectional view taken along the line XVII-XVII illustrated in FIG. 15B.

FIGS. 15A, 15B illustrate dies to which the third embodiment can be applied. FIG. 15A is an exploded perspective view illustrating the dies on which the primary molding has been performed and the secondary molding is being performed. FIG. 15B is a perspective view illustrating the dies that have been clamped. FIG. 16 is a cross sectional view taken along the line XVI-XVI illustrated in FIG. 15B. FIG. 17 is a cross-sectional view taken along the line XVII-XVII illustrated in FIG. 15B and illustrates a state where the thermosetting resin 70 is poured in the secondary molding.

As illustrated in FIG. 15A, according to the present embodiment, a communication path (communication portion) 25 for communicating the cavity of the upper die 10 with the cavity of the lower die 30 via the intermediate die 81 is provided. As illustrated in FIG. 16, when a runner resin 158 is left over a whole width of the groove 98 of the intermediate die 81, a secondary-molding injection path is formed at an upper side or a lower side of the runner resin 158. The secondary-molding injection path 39a is communicated with a cavity 312 communicated with a cavity 313 via the communication path 25, and the secondary-molding injection path 39b is communicated with the cavity 313 communicated with the cavity 312 via the communication path 25.

In other words, the secondary-molding injection path 39 has individual injection paths. In such a case, when the thermosetting resin 70 is injected, since the plunger 40 passes through the secondary-molding injection path 39a formed at an upper side earlier than the secondary-molding injection path 39b formed at a lower side, the secondary-molding injection path 39a finishes injection of the resin earlier. However, as illustrated in FIG. 17, since upper and lower cavities are communicated with each other via the communication path 25, an injection pressure can be applied to a cavity 152 at an upper side of the intermediate die 81 and a cavity 153 at a lower side thereof for the same hours. Therefore, similarly to the first embodiment in which the upper and lower cavities are communicated with each other at the secondary-molding injection path 39, the secondary molding can be performed. A position where the communication path 25 is provided is not limited to the position described above, but may be a position where the upper and lower cavities can be communicated with each other.

Figure 18:
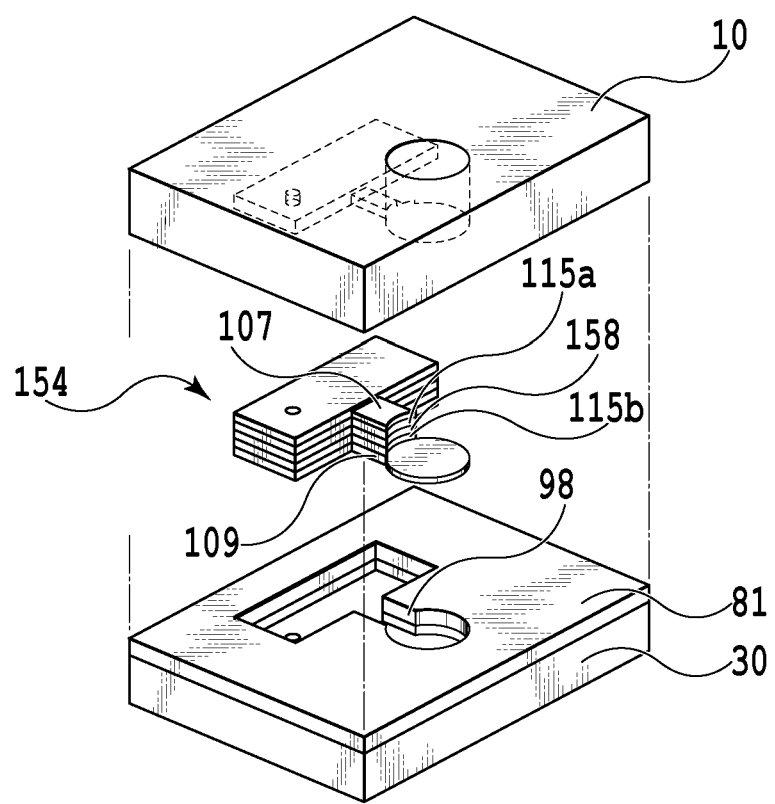
FIG. 18 is a perspective view illustrating a demolding process.

FIG. 18 is a perspective view illustrating a demolding process according to the present embodiment. Even in a configuration where the runner resin 115a, 115b molded in the secondary molding are disposed at an upper portion and a lower portion of the runner resin 158 molded in the primary molding in the intermediate die that is sandwiched therebetween, the intermediate die 81 is acquired by simply letting go through an outer shape of the molded article, the second groove 98, and the chamber that are combined with one another, and hollowing out in the outer shape thereof. Therefore, the layered component 414 can be easily released by pushing it up.

As described above, the similar effect to that of the first embodiment can be acquired by the transfer molding method in which the communication path communicating the cavity of the upper die 10 with the cavity of the lower die 30 via the intermediate dies.

(Fourth Embodiment)

With reference to drawings, the fourth embodiment of the present invention will be described below. Since a basic configuration according to the present embodiment is the same as that of the first embodiment, only discriminative configurations will be described below.

Figure 19A:
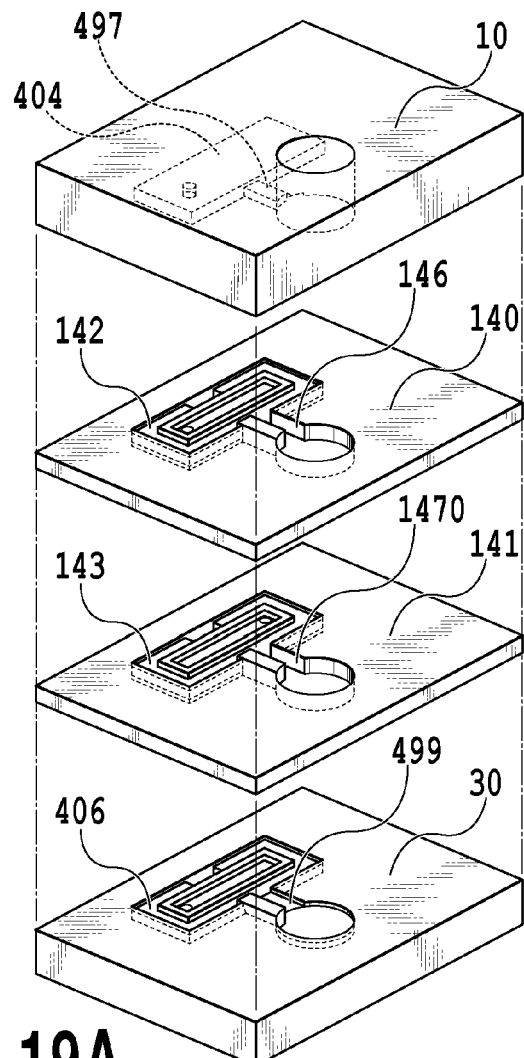
FIG. 19A illustrates dies to which a fourth embodiment can be applied.
Figure 19B:
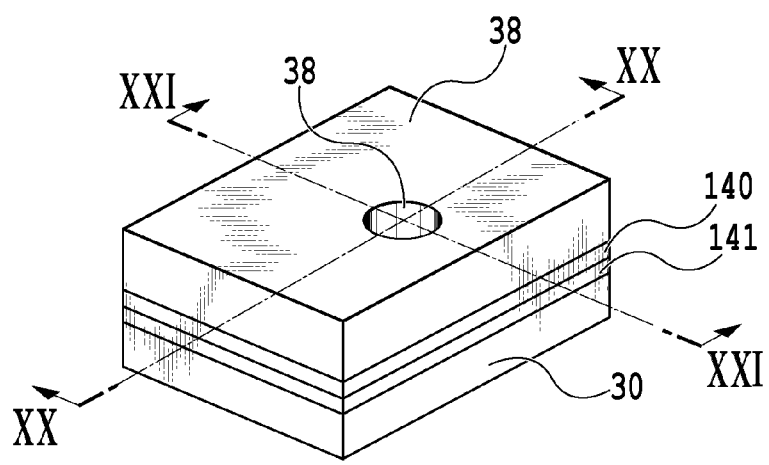
FIG. 19B illustrates the dies to which the fourth embodiment can be applied.
Figure 20:
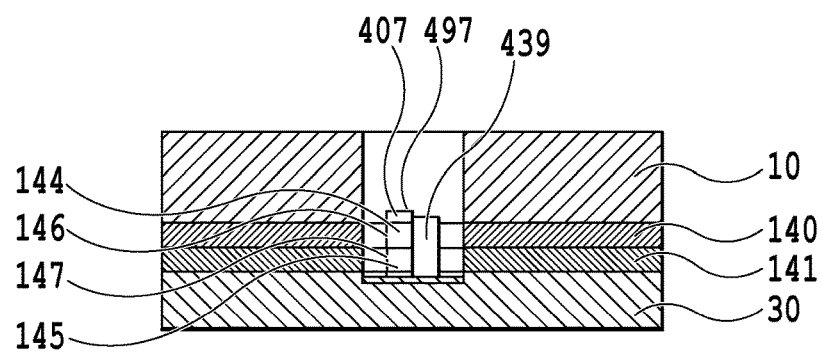
FIG. 20 is a cross-sectional view taken along the line XX-XX illustrated in FIG. 19B.
Figure 21:
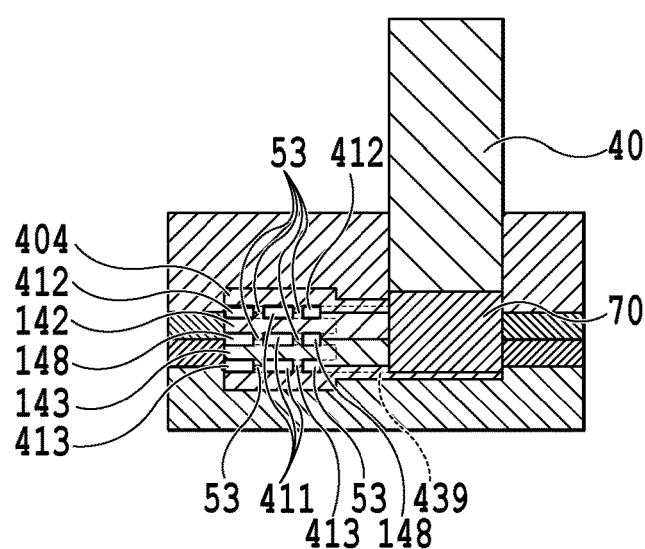
FIG. 21 is a cross-sectional view taken along the line XXI-XXI illustrated in FIG. 19B.

FIGS. 19A, 19B illustrate the dies to which the fourth embodiment can be applied. FIG. 19A is an exploded perspective view illustrating the dies on which the primary molding has been performed and the secondary molding is being performed. FIG. 19B is a perspective view illustrating the dies that have been clamped. FIG. 20 is a cross sectional view taken along the line XX-XX illustrated in FIG. 19B. FIG. 21 is a cross-sectional view taken along the line XXI-XXI illustrated in FIG. 19B.

As illustrated in FIG. 19A, the present embodiment includes four dies of the upper die 10, a first intermediate die 140, a second intermediate die 141, and the lower die 30. The upper die 10 holds a divided body 404 that is the primary molded article, the first intermediate die 140 holds a divided body 142, the second intermediate die 141 holds a divided body 143, and the lower die 30 holds a divided body 406.

FIG. 19B illustrates a state where the dies described above are clamped. FIG. 20 illustrates a state of the injection path viewed from the chamber 38. As illustrated in FIG. 20, a groove 497, a groove 146, a groove 147, and a groove 499 are combined with one another, to form a secondary-molding injection path 439 communicating the chamber 38 with a new cavity. The resin used in the primary molding is left in a portion of each groove that has functioned as the injection path in the primary molding.

A runner resin 407 communicating with the divided body 404 is left in the groove 497, a runner resin 144 communicating with the divided body 142 is left in the groove 146, a runner resin 145 communicating with divided body 143 is left in the groove 147, and a runner resin 409 communicating with the divided body 406 is left in the groove 499. The groove 146 of the first intermediate die 140 and the groove 147 of the second intermediate die 141 have a shape of passing through in a thickness direction of each intermediate die, and form a part of the secondary-molding injection path 439 at a side face 410 of the runner resin 144, 145.

As illustrated in FIG. 21, the dies are clamped to make the divided bodies abut on each other, a space 411 is formed at an inside surrounded by the abutment portions 53, and cavities 412, 413 molded by the secondary molding are formed outside the abutment portions 53, and a cavity 148 to be formed between the divided body 142 and the divided body 143 is formed. Between the divided body 404 and the divided body 142 that is one divided body of the two divided bodies 142, 143 formed with the intermediate dies 140, 141 when the primary molding is performed, the cavity 412 and the space 411 are formed.

Further, between the divided body 406 and the divided body 143 that is the other divided body of the two divided bodies 142, 143 formed in the intermediate dies 140, 141 when the primary molding is performed, the cavity 413 and the space 411 are formed. Between the divided body 142 and the divided body 143, the cavity 148 and the space 411 are formed. Each cavity is communicated with the chamber 38 via the secondary-molding injection path 439. Further, the cavities 412, 148, 413 are communicated with one another via the secondary-molding injection path 439. The secondary molding is also performed by pouring the thermosetting resin 70 in the amount of load of molding into the chamber 38.

Figure 22:
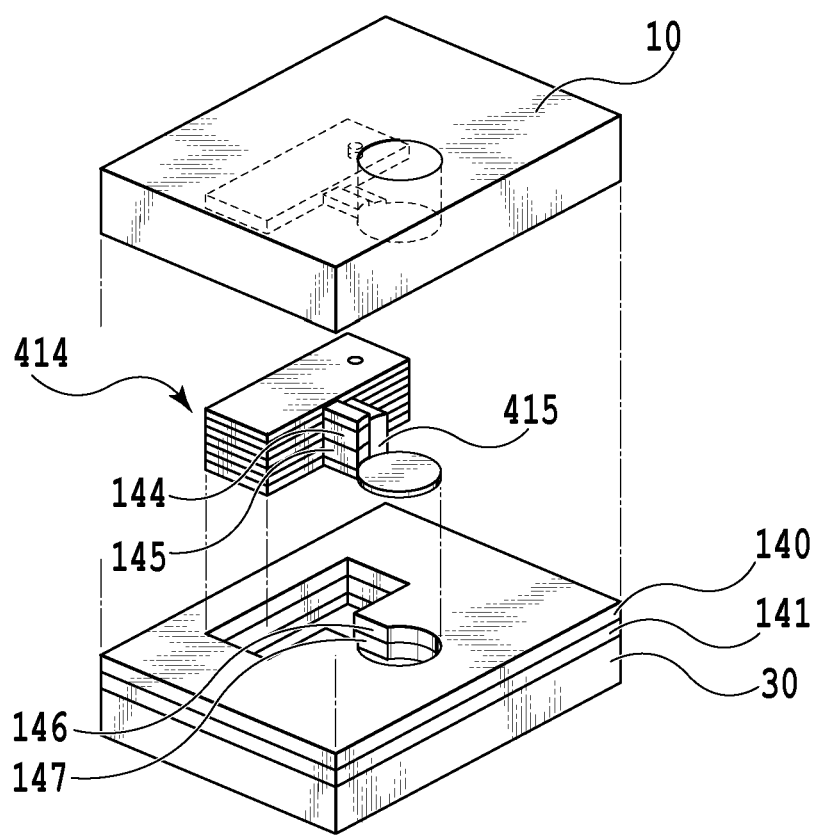
FIG. 22 is a perspective view illustrating the demolding process according to the fourth embodiment.

FIG. 22 is a perspective view illustrating a demolding process according to the fourth embodiment. The first intermediate die 140 and the second intermediate die 141 are acquired by simply letting go through an outer shape of the molded article, the grooves 146, 147, and the chamber that are combined with one another, and hollowing out in the outer shape thereof. Therefore, the layered component 154 can be easily released by pushing it up.

Figure 23:
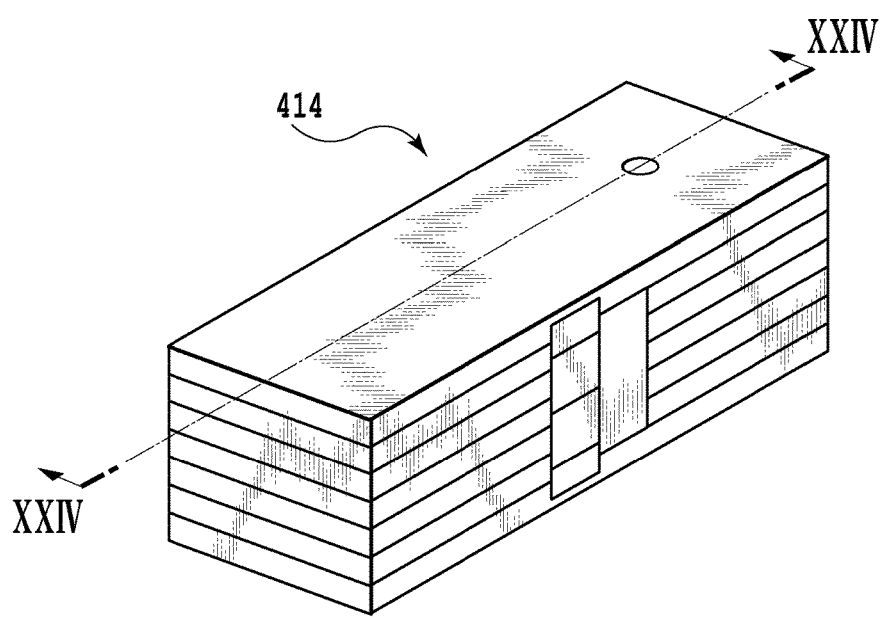
FIG. 23 is a perspective view of a layered molded article completed according to the fourth embodiment.
Figure 24:
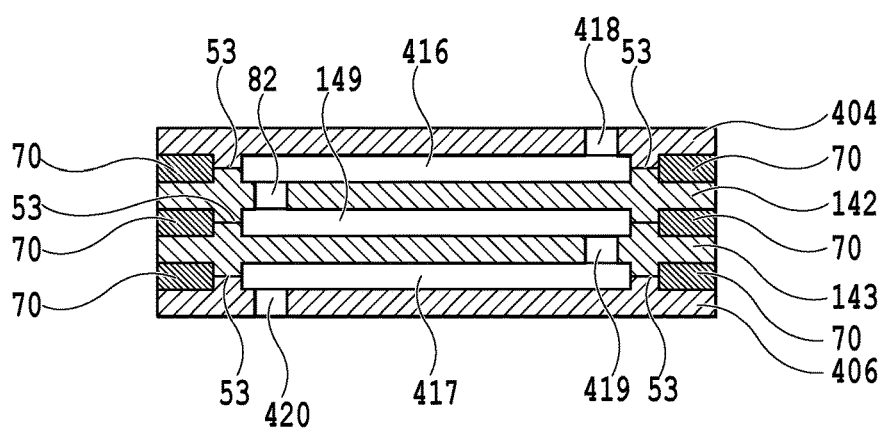
FIG. 24 is a cross-sectional view taken along the line XXIV-XXIV illustrated in FIG. 23.

FIG. 23 is a perspective view of the layered molded article that has been completed according to the fourth embodiment. FIG. 24 is a cross-sectional view taken along the line J-J illustrated in FIG. 23. The layered component 414 is formed by layering the divided body 404, the divided body 142, the divided body 143, and the divided body 406, which are joined with one other with the thermoset resin 70 that has been injected into an outer circumference of the abutment portions 53 and hardened in the secondary molding. The spaces 416, 417, 149 are formed inside the abutment portions 53, and an inlet 418 is formed in the divided body 404, a communication opening 419 is formed in the divided bodies 142, 143, and an outlet 420 is formed in the divided body 406.

According to the present embodiment, the layered component that is layered in four layers using the two intermediate dies is formed, but, the present invention is not limited to the layered component described above, but a method may be adopted for forming the layered component using the plurality of intermediate dies.

As described above, the layered hollow component including three-layer inner space can be molded, and the similar effect as that of the first embodiment can be acquired. The first to fourth embodiments described above can be combined with one another to be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-099611 filed May 13, 2014, which is hereby incorporated by reference wherein in its entirety.

What is claimed is:

1. A transfer molding method for molding a thermosetting resin, comprising:
 a first molding step of molding a first divide body, a second divided body, and a third divided body by preparing a fist die, a second die, and a third die, clamping the second die between the first die and the third die, and injecting the thermosetting resin into the first die, the second die, and the third die;
 a clamping step of making the first divided body abut the second divided body and making the second divided body abut the third divided body by retracting the second die; and
 a second molding step of injecting a thermosetting resin into a first cavity formed by the first divided body and the second divided body and a second cavity formed by the second divided body and the third divided body, joining the first divided body and the second divided body, and joining the second divided body and the third divided body.

2. The transfer molding method according to claim 1, wherein the first divided body, the second divide body, and the third divided body form a chamber and injection paths, and
 wherein the chamber, the first cavity, and the second cavity are communicated with one another via individual injection paths.

3. The transfer molding method according to claim 1, wherein the first divided body, the second divided body, and the third divided body form a chamber and injection paths, and
 wherein the chamber is communicated with the first cavity and the second cavity via a common injection path.

4. The transfer molding method according to claim 3, wherein the second die includes two dies, the second divided body includes two divided bodies, and the two dies are clamped so that a third cavity surrounded by a part of one of the two divided bodies and a part of the other of the two divided bodies is formed.

5. The transfer molding method according to claim 4, wherein the first divided body, the second divided body, and the third divided body form a chamber and injection paths, and
   wherein the chamber is communicated with the first cavity, the second cavity, and the third cavity via a common injection path.

6. The transfer molding method according to claim 1, wherein the first cavity and the second cavity are communicated with each other via the second die.

7. The transfer molding method according to claim 1, wherein the first divided body, the second divided body, and the third divided body are formed by one molding device.

8. The transfer molding method according to claim 1, wherein the first divided body and the third divided body are molded by a first molding device, and the second divided body is molded by a second molding device.

9. The transfer molding method according to claim 1, wherein a thermosetting resin not including a mold release agent component is used for the thermosetting resin.

10. The transfer molding method according to claim 1, wherein an epoxy resin composition is used for the thermosetting resin.

11. A molded article molded by a transfer molding method according to claim 1.

* * * * *